US008332592B2

(12) United States Patent
Hoover et al.

(10) Patent No.: US 8,332,592 B2
(45) Date of Patent: Dec. 11, 2012

(54) GRAPHICS PROCESSOR WITH SNOOP FILTER

(75) Inventors: Russell D. Hoover, Rochester, MN (US); Eric O. Mejdrich, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 2267 days.

(21) Appl. No.: 10/961,750

(22) Filed: Oct. 8, 2004

(65) Prior Publication Data

US 2006/0080512 A1    Apr. 13, 2006

(51) Int. Cl.
*G06F 12/02* (2006.01)

(52) U.S. Cl. ......... 711/146; 711/133; 711/141; 711/144

(58) Field of Classification Search ................. 711/141, 711/144, 146, 133
See application file for complete search history.

(56) References Cited

U.S. PATENT DOCUMENTS

| 4,928,225 | A | * | 5/1990 | McCarthy et al. ............ 711/145 |
| 4,939,641 | A | * | 7/1990 | Schwartz et al. ............. 711/146 |
| 5,113,514 | A | * | 5/1992 | Albonesi et al. ............. 711/144 |
| 5,265,232 | A | * | 11/1993 | Gannon et al. ............... 711/124 |
| 5,291,442 | A | * | 3/1994 | Emma et al. .................. 711/120 |
| 5,581,705 | A | | 12/1996 | Passint et al. |
| 5,586,298 | A | | 12/1996 | Shah |
| 5,706,463 | A | * | 1/1998 | Ebrahim et al. .............. 711/120 |
| 5,841,973 | A | | 11/1998 | Kessler et al. |
| 5,875,462 | A | | 2/1999 | Bauman et al. |
| 5,890,217 | A | * | 3/1999 | Kabemoto et al. ............ 711/141 |
| 5,907,853 | A | * | 5/1999 | Jacobs et al. .................... 711/3 |
| 6,067,611 | A | * | 5/2000 | Carpenter et al. .............. 712/28 |
| 6,073,212 | A | * | 6/2000 | Hayes et al. .................. 711/122 |
| 6,092,173 | A | * | 7/2000 | Sasaki et al. .................... 712/14 |
| 6,124,868 | A | | 9/2000 | Asaro et al. |
| 6,292,705 | B1 | * | 9/2001 | Wang et al. ...................... 700/5 |
| 6,321,298 | B1 | * | 11/2001 | Hubis ........................... 711/124 |
| 6,363,438 | B1 | | 3/2002 | Williams et al. |
| 6,449,699 | B2 | | 9/2002 | Franke et al. |
| 6,725,296 | B2 | | 4/2004 | Craddock et al. |
| 6,801,207 | B1 | | 10/2004 | Tischler et al. |
| 6,801,208 | B2 | | 10/2004 | Keshava et al. |
| 6,820,143 | B2 | | 11/2004 | Day et al. |
| 6,820,174 | B2 | | 11/2004 | Vanderwiel |
| 2002/0133735 | A1 | * | 9/2002 | McKean et al. .................. 714/5 |
| 2003/0005202 | A1 | * | 1/2003 | Bakke et al. ................... 710/305 |
| 2004/0006716 | A1 | * | 1/2004 | Schuckle et al. .............. 713/300 |
| 2004/0117580 | A1 | * | 6/2004 | Wu et al. ....................... 711/170 |
| 2004/0117592 | A1 | | 6/2004 | Day et al. |
| 2004/0162946 | A1 | | 8/2004 | Day et al. |
| 2004/0263519 | A1 | | 12/2004 | Andrews et al. |

* cited by examiner

*Primary Examiner* — John Lane
(74) *Attorney, Agent, or Firm* — Patterson & Sheridan LLP

(57) ABSTRACT

Methods and apparatus that may be utilized to maintain coherency of data accessed by both a processor and a remote device are provided. The remote device may include coherency logic, referred to herein as a snoop filter, designed to filter memory access requests that do not require bus commands to be sent to the processor. The snoop filter may filter requests based on a remote cache directory designed to mirror the processor cache directory, such that only those requests that target cache lines indicated to be valid in the processor cache result in snoop commands sent to the processor. Other requests (targeting data that is not cached in the processor) may be routed directly to memory without the latency conventionally associated with snoop requests.

17 Claims, 7 Drawing Sheets

| GPU SNOOP FILTER UPDATES FROM CPU REQUEST |||
| --- | --- | --- |
| CPU REQUEST | SF UPDATE | COMMENTS |
| READ | V | |
| RWNITC | NONE | |
| RWITM | V | |
| REFLECTED REQUEST | NONE | READ REQUESTSENT BACK DUE TO NULL L2 RESPONSE |
| WRITE WITH KILL (CASTOUT) | I | NEW L2 ALLOCATIONS ONLY |
| WRITE WITH KILL (PUSH) | NONE | DOESN'T PROVIDE WAY |
| WRITE WITH FLUSH | NONE | CACHE INHIBITED |
| WRITE WITH CLEAN | NONE | SF SHOULD = "V" ALREADY |
| DCLAIM | V | ALLOCATE NEW ENTRY |

FIG. 4A

| GPU SNOOP FILTER DIRECTORY READS AND RESULTING REQUESTS |||||
| --- | --- | --- | --- | --- |
| GPU REQUEST | SF STATE | REQUEST TARGET | REQUEST RESPONSE | FINAL RESPONSE |
| LOAD FROM MEMORY | I | MEMORY | – | MEMORY DATA |
| | V | FSB | RWITM | MEMORY OR L2 DATA |
| LOAD FROM L2 (LOCKED SET) | – | FSB | READ | L2 DATA |
| STORE TO MEMORY | I | MEMORY | – | – |
| | V | FSB | FLUSH | FLUSHACK |

FIG. 4B

GRAPHICS PROCESSOR WITH SNOOP FILTER

CROSS-REFERENCE TO RELATED APPLICATIONS

This application is related to commonly owned U.S. patent applications entitled "Enhanced Bus Transactions for Efficient Support of a Remote Cache Directory Copy", (U.S. Ser. No. 10/961,742 now abandoned), "Direct Access of Cache Lock Set Data Without Backing Memory", (U.S. Pat. No. 7,475,190), "Efficient Low Latency Coherency Protocol for a Multi-Chip Multiprocessor System", (U.S. Pat. No. 7,577,794), "Snoop Filter Directory Mechanism In Coherency Shared Memory System", (U.S. Pat. No. 7,305,524), which are herein incorporated by reference.

BACKGROUND OF THE INVENTION

1. Field of the Invention

This application generally relates to data processing systems and, more particularly, to systems in which one or more remote devices, such as a graphics processor, access data that may be cached by a central processor.

2. Description of the Related Art

In a multiprocessor system, or any type of system that allows more than one device to request and update blocks of shared data concurrently, it is important that some mechanism exists to keep the data coherent (i.e., to ensure that each copy of data accessed by any device is the most current copy). In many such systems, a processor has one or more caches to provide fast access to data (including instructions) stored in relatively slow (by comparison to the cache) external main memory. In an effort to maintain coherency, other devices on the system (e.g., a graphics processing unit-GPU) may include some type of coherency or "snoop" logic to determine if a copy of data from a desired memory location is held in the processor cache by sending commands (snoop requests) to a processor cache directory.

This snoop logic is used to determine if desired data is contained in the processor cache and if it is the most recent (modified) copy, typically by querying the processor cache directory to examine address tags and corresponding coherency bits of entries stored therein. In order to work with the latest copy of the data, the device may request ownership of the modified copy stored in a processor cache line. In a conventional coherent system, devices requesting data do not know ahead of time whether the data is in a processor cache. As a result, each device must query (snoop) the processor cache directory for every memory location that it wishes to access from main memory to make sure that proper data coherency is maintained, which can be very expensive both in terms of both command latency and microprocessor bus bandwidth.

Accordingly, what is needed is an efficient method and system which would reduce the amount of latency associated with interfacing with (snooping on) a processor cache.

SUMMARY OF THE INVENTION

Embodiments of the present invention generally provide methods and apparatus that may be utilized to reduce the amount of latency associated with interfacing with (snooping on) a processor cache.

One embodiment provides a method of maintaining coherency of data accessed by a remote device. The method generally includes maintaining, on the remote device, a remote cache directory indicative of memory locations residing in a cache on a processor which shares access to some portion of a memory device, and routing a memory request issued at the remote device to the memory device without sending snoop requests to the processor if information contained in the remote cache directory indicates a valid copy of data targeted by the request does not reside in the processor cache.

Another embodiment provides a device configured to access data stored in memory and cacheable by a processor. The device generally includes at least one processing core, a remote cache directory indicative of contents of a cache residing on the processor, and a snoop filter. The snoop filter is generally configured to route a memory request issued by the processing core to a memory device without sending snoop requests to the processor if information contained in the remote cache directory indicates a valid copy of data targeted by the memory request does not reside in the processor cache.

Another embodiment provides a coherent system generally including a processor and a remote device. The processor generally includes a cache for storing data accessed from an external memory device and a cache directory with entries indicating which memory locations are stored in cache lines of the cache and corresponding coherency states thereof. The remote device generally includes a remote cache directory indicative of contents of the cache residing on the processor and a snoop filter configured to route a memory request issued at the remote device to the memory device without sending snoop requests to the processor if information contained in the remote cache directory indicates a valid copy of data targeted by the memory request does not reside in the processor cache.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 4A illustrates exemplary remote cache directory updates in response to central processing unit (CPU) requests, in accordance with embodiments of the present invention;

FIG. 4B illustrates exemplary requests generated at a remote device based on remote cache directory reads, in accordance with embodiments of the present invention;

DETAILED DESCRIPTION OF THE PREFERRED EMBODIMENTS

Embodiments of the present invention generally provide methods and apparatus that may be utilized to maintain coherency of data accessed by both a processor and a remote device. The remote device may include coherency logic, referred to herein as a snoop filter, designed to filter memory access requests that do not require bus commands to be sent to the processor. The snoop filter may filter such requests based on a remote cache directory designed to mirror the processor cache directory. Based on the content of the remote cache directory, only those requests that target cache lines indicated to be valid in the processor cache may result in snoop commands sent to the processor. Other requests (targeting data that is not cached in the processor) may be routed directly to memory, thus reducing latency associated with the snoop requests and responses and conserving bus bandwidth.

As used herein, the term cache coherency refers to the generally desirable property that accessing a copy of data (a cache line) from a cache gives the same value as the underlying data, even when the data was modified after the data was first cached. Maintaining cache coherency is important for consistent operation of multiprocessor systems in which one or more processor has a non-shared cache used to cache portions of a memory area shared by multiple processors.

In the following description, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

An Exemplary System

Figure 1:
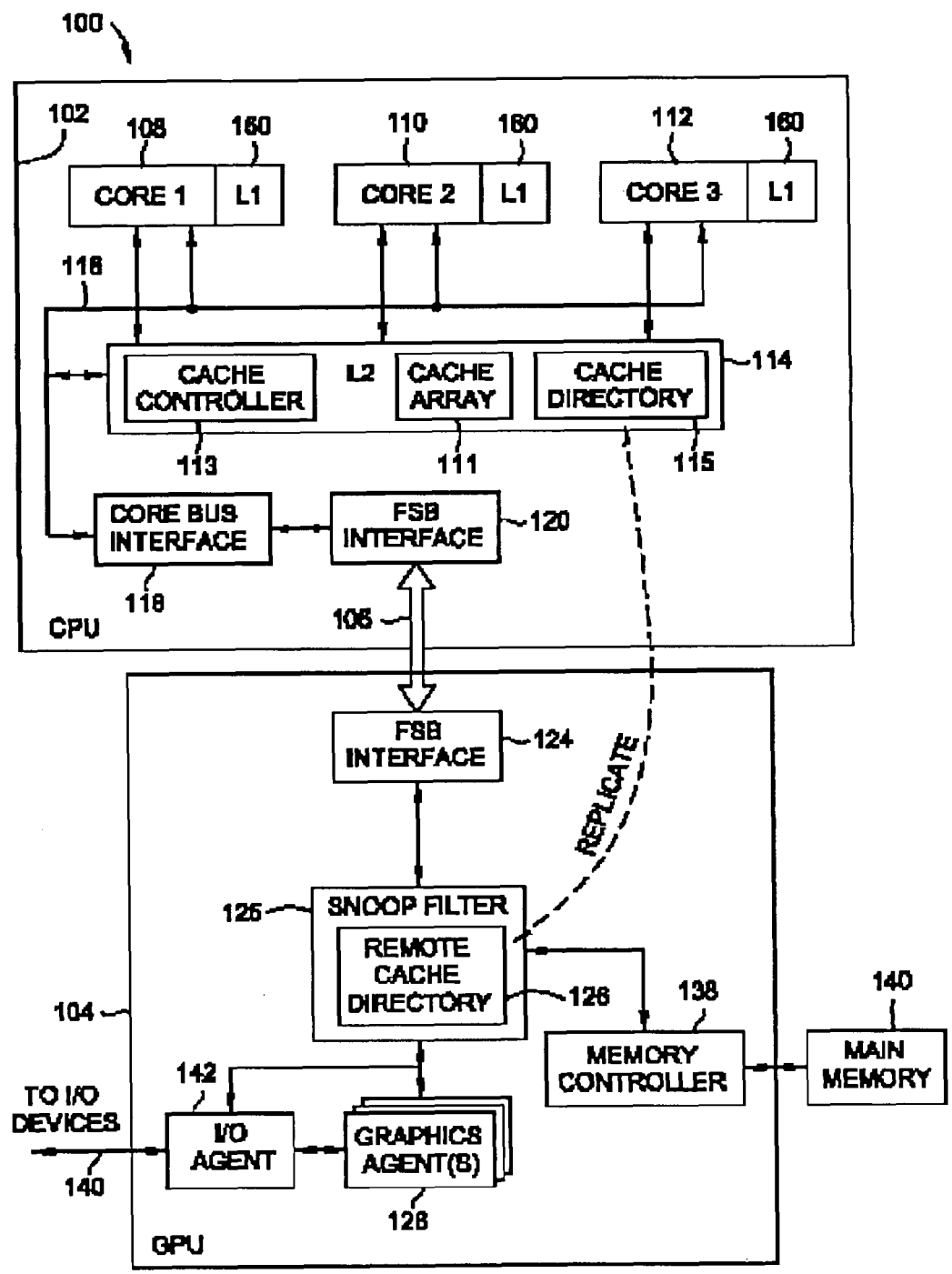
FIG. 1 illustrates an exemplary system in accordance with embodiments of the present invention.

FIG. 1 schematically illustrates an exemplary multi-processor system 100 in which a processor (illustratively, a CPU 102) and a remote processor device (illustratively, a GPU 104) both access a shared main memory 140. While a GPU 104 is shown as an exemplary remote device, the techniques and mechanisms described herein may be utilized in any type of device that has a need to snoop a processor cache, such as an input/output (I/O) controller, audio digital signal processor (DSP), or any other type device. In the illustrated embodiment, main memory 140 is near the GPU 104 and is accessed by a memory controller 138 which, for some embodiments, is integrated with (i.e., located on) the GPU 104. The system 100 is merely one example of a type of system in which embodiments of the present invention may be utilized to maintain coherency of data accessed by multiple devices.

As shown, the CPU 102 and the GPU 104 communicate via a front side bus (FSB) 106. The CPU 102 illustratively includes a plurality of processor cores 108, 110, and 112 that perform tasks under the control of software. The processor cores may each include any number of different type function units including, but not limited to arithmetic logic units (ALUs), floating point units (FPUs), and single instruction multiple data (SIMD) units. Examples of CPUs utilizing multiple processor cores include the Power PC line of CPUs, available from International Business Machines (IBM). Each individual core may have a corresponding L1 cache 160 and may communicate over a common bus 116 that connects to a core bus interface 118. For some embodiments, the individual cores may share an L2 (secondary) cache memory 114.

As illustrated, the L2 cache 114 may include a cache array 111, cache directory 115, and cache controller 113. For some embodiments, the L2 cache 114 may be an associative cache and the cache directory 114 may include entries indicating addresses of cache lines stored in each "way" of an associative set, as well as an indication of a coherency state of each line. For some embodiments, the L2 cache 114 may be operated in accordance with the MESI protocol (supporting Modified, Exclusive, Shared, and Invalid states), or some variant thereof. The core bus interface 118 communicates with the L2 cache memory 114, and carries data transferred into and out of the CPU 102 via the FSB 106, through a front-side bus interface 120.

The GPU also includes a front-side bus interface 124 that connects to the FSB 106 and that is used to pass information between the GPU 104 and the CPU 102. The GPU 104 is a device capable of processing large amounts of data at very high speed using sophisticated data structures and processing techniques. To do so, the GPU 104 includes at least one graphics core 128 that processes data obtained from the CPU 102 or from main memory 140 via the memory controller 138. For some embodiments, the GPU 104 may also include an I/O agent 142 that passes data to and from any number of external devices, such as a mouse, video joy stick, computer board, and display over I/O bus 140. The graphics core 128 and I/O agent 142 may communicate with the FSB Interface 124 via a bus 132.

As previously described, in conventional multi-processor systems, such as system 100, in which one or more remote devices request access to data for memory locations that are cached by a central processor, the remote devices often utilize some type of coherency logic to monitor (snoop) the contents of the processor cache. Typically, this snoop logic interrogates the processor cache directory for entries for every memory location the remote device wishes to access. As a result, conventional cache snooping may result in substantial latency and consume a significant amount of processor bus bandwidth.

Snoop Filter Mechanism

Figure 2:
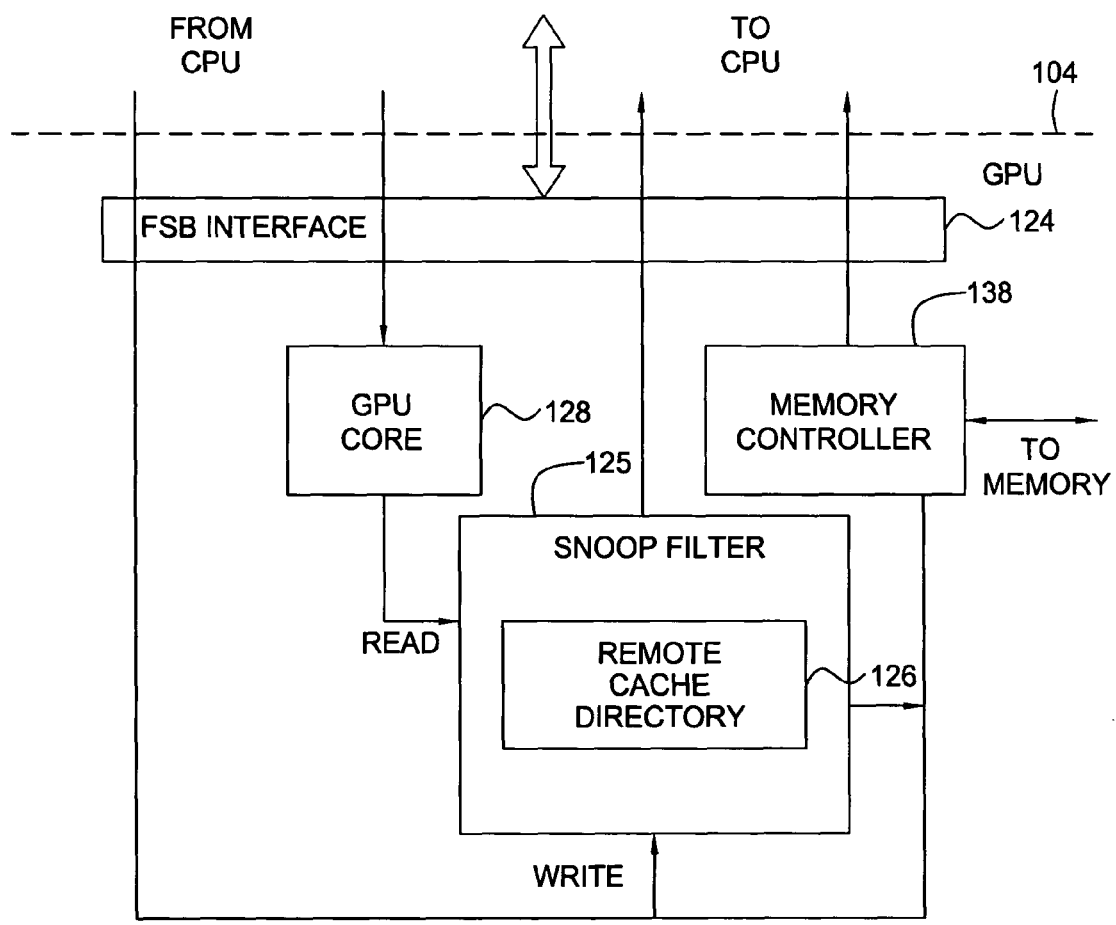
FIG. 2 illustrates an exemplary graphics processor with coherency logic (a snoop filter), in accordance with embodiments of the present invention.

In an effort to reduce such latency and increase bus bandwidth, embodiments of the present invention may utilize coherency logic (a snoop filter 125) located on the remote device. The snoop filter 125 may maintain a remote cache directory 126 that mirrors the coherency states indicated in the cache directory 114 located on the CPU 102. FIG. 2 illustrates a relational view of one system configuration utilizing these components to maintain coherency.

As illustrated, the snoop filter 125 may be placed between all coherent requestors (e.g., I/O agent 142 and graphics agents 128) on the GPU 104 and system memory and CPU caches. In this configuration, all coherent accesses from any requestor can be filtered, such that only those requests that target cache lines indicated to be valid in the processor cache (as determined by examining the remote cache directory 126) may result in snoop commands sent to the processor. Other requests (targeting data that is not cached) may be routed directly to memory, thus reducing latency associated with the snoop requests and responses and conserving bus bandwidth.

Figure 3:
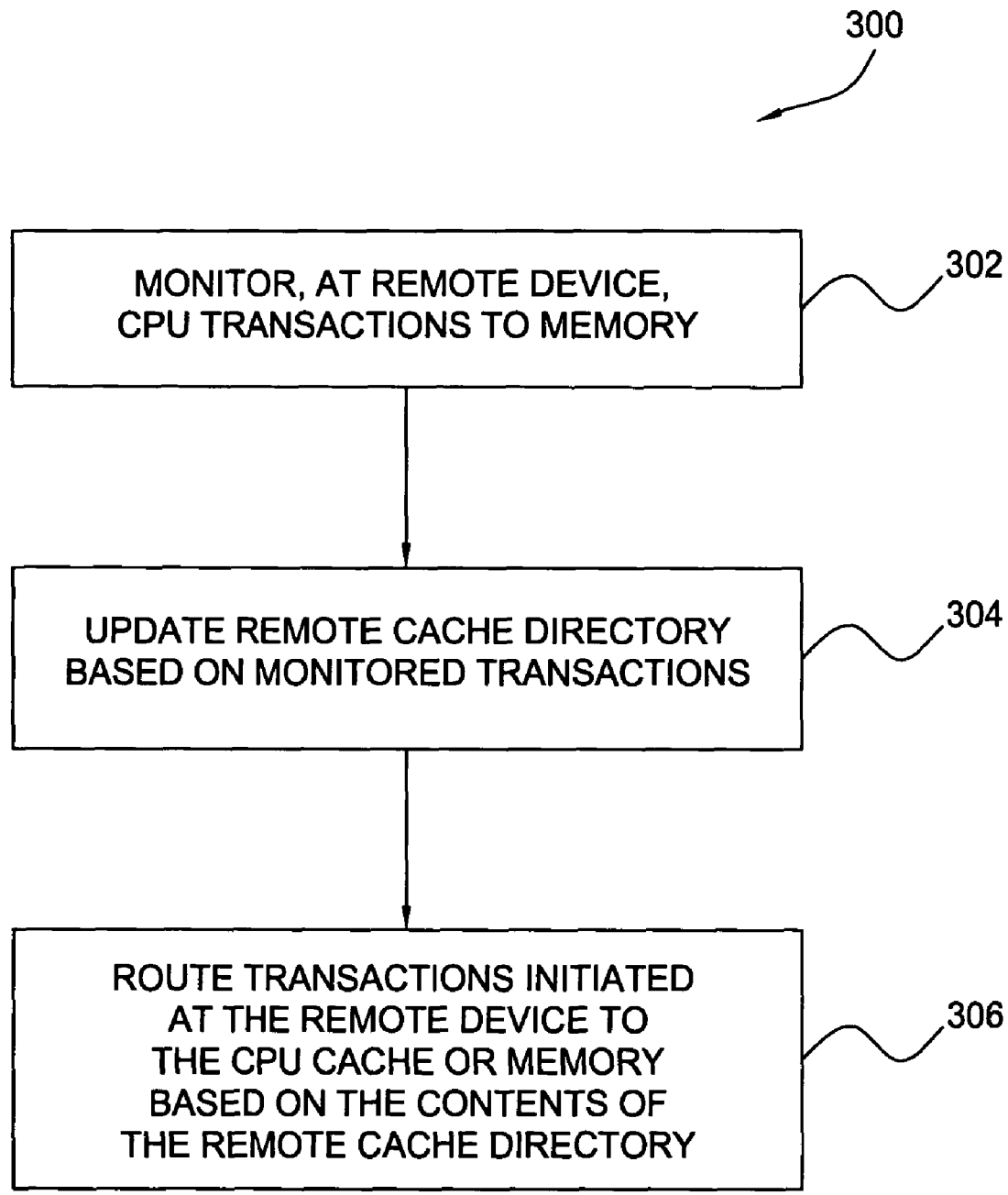
FIG. 3 is a flow diagram of exemplary operations for maintaining cache coherency, in accordance with embodiments of the present invention.

FIG. 3 illustrates exemplary operations 300 that may be performed (e.g., by the snoop filter 125) to update the remote cache directory 126 and route coherent requests accordingly. The operations begin, at step 302, by monitoring, at the remote device (e.g., GPU 104), CPU transactions to memory. At step 304, the remote cache directory is updated based on the monitored transaction, to reflect changes to the CPU cache directory. At step 306, transactions originating at the remote device are routed to the CPU cache or directly to memory based on the contents of the remote cache directory.

By routing memory requests from the CPU through the remote device, the snoop filter 125 may update the remote cache directory 126 to reflect changes to the CPU cache 115, based on information contained in the requests, without separate bus commands to "snoop" the CPU cache directory. For some embodiments, the snoop filter 125 may monitor these transactions "in parallel" as they are sent to the memory controller 138, without adding latency to the transaction processing.

FIG. 4A shows a table listing exemplary updates that may be made to the remote cache (snoop filter) directory 126 in response to central processing unit (CPU) requests, monitored by the snoop filter 125. As illustrated, read requests that result in cache entries, will generally result in a valid (V) snoop filter state for a corresponding entry in the remote cache directory 126, as will allocation actions (e.g., Dclaim). In other words, such read requests will result in the creation of an entry in the remote cache directory containing an address tag corresponding to a memory location targeted by the request and corresponding coherency bits. On the other hand, reads with no intent to cache (RWNITC) will have no effect. Writes that indicate cached data has been modified, such as a write with kill (WWK) with a castout will result in a transition to an invalid (I) state of a directory entry. Other types of writes that do not indicate modified data (a write with flush, write with clean, or a "pushed" write with kill), will result in no change.

In some cases, the CPU transactions monitored by the snoop filter 125 may be enhanced bus transactions that include additional coherency information, such as a set_id indicating a way within an associative set of cache lines that is being allocated. This information allows the snoop filter 125 to create/modify a corresponding entry (for the specified way) reflecting the location being cached and the coherency state. By indicating the way of the cache line being allocated/ de-allocated, this additional information may allow the remote cache directory to be the same size as the CPU cache directory, for some embodiments. The creation and utilization of such enhanced bus transactions are described in the commonly owned U.S. patent application entitled "Enhanced Bus Transactions for Efficient Support of a Remote Cache Directory Copy".

FIG. 4B shows a table listing how requests generated at a remote device (e.g., GPU 104) may be routed depending on the contents of the remote cache directory 126. As illustrated, if a request is issued to load data from memory, if there is a miss in the remote cache directory (e.g., there is no entry or only an invalid entry for a memory location targeted by the request), the request is routed to memory. On the other hand, if there is a valid entry for the targeted memory location, a request is sent, via the FSB, to read data from the CPU. For some embodiments, this read request may be a read with intent to modify (RWITM), causing the CPU cache directory entry to be invalidated. Requests to store (write) data to memory may be routed in a similar manner, with writes that miss in the remote cache directory routed directly to memory. If a write hits in the remote cache directory, a request may be sent to the CPU to invalidate its copy of the data (if not modified) or castout its copy (if modified). If the data is valid, the CPU will do a write with kill (WWK) to evict the cache line to memory and then send a flush acknowledge (FLUSH-ACK) response.

For some embodiments, a single coherency bit may be utilized in the remote cache directory, with a valid (V) value indicating a corresponding cache line is in the L2 cache in a valid state or an invalid (I) value indicating the corresponding cache line is not the L2 cache in a valid state. However, for other embodiments, more than a single coherency bit may be utilized in the remote cache directory, which may provide a greater flexibility when routing memory requests issued at the remote device. For example, additional coherency bits may allow a shared (S) state to be reflected in the remote cache directory, indicating a corresponding cache line is in the L2 cache in a valid state, but is identical to the copy in memory. Thus, a request issued at the remote device targeting a shared cache line may be routed to either memory or the CPU. Whether such a request is routed to memory or the CPU may depend on a number of considerations, such as which device will respond with the requested data, bus bandwidth considerations, and the like.

Routing Remote Device Memory Requests

Figure 5:
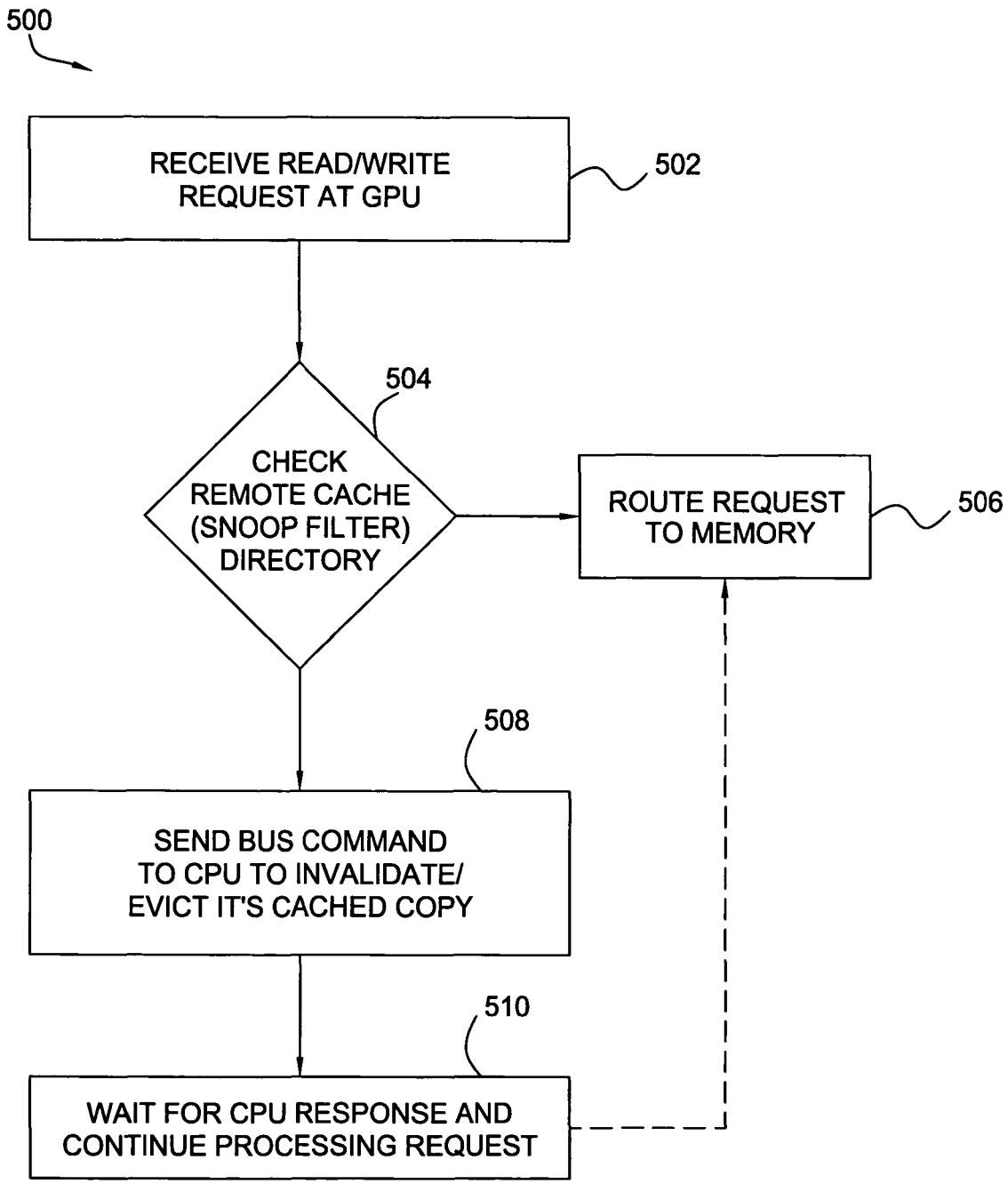
FIG. 5 is a flow diagram of exemplary operations for routing remote device memory access requests based on the contents of the remote cache directory, in accordance with embodiments of the present invention.
Figure 6A:
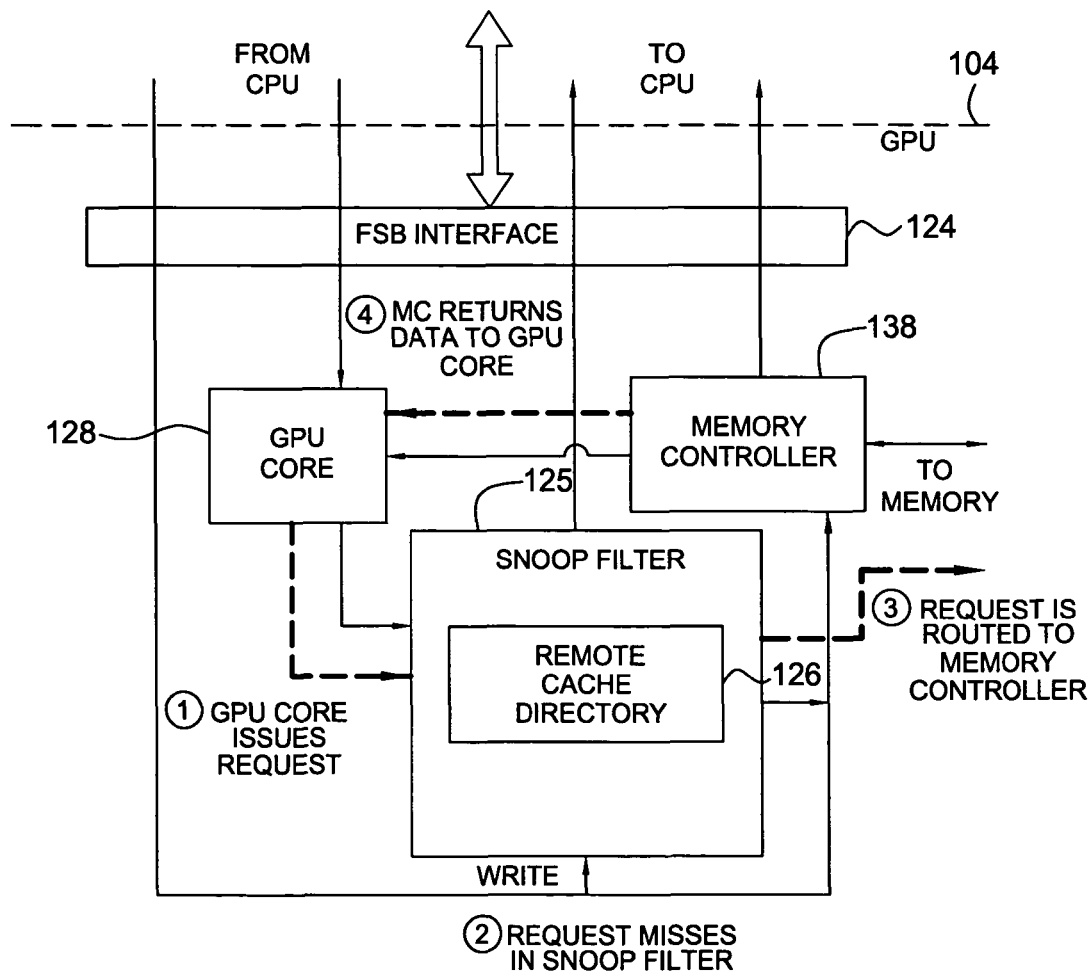
FIGS. 6A-6B illustrate exemplary data path diagrams for remote device memory access requests, in accordance with embodiments of the present invention.

FIG. 5 is a flow diagram (of exemplary operations 500) the GPU snoop filter 125 may perform to router requests in a manner consistent with FIG. 4B. At step 502, the snoop filter receives a read/write request originating at the GPU. If the request misses in the remote cache directory 126, as determined at step 504, the request is routed directly to memory, at step 506. This scenario is illustrated in the exemplary data path diagram of FIG. 6A, in which various events are enumerated (1-4). First, a GPU core or other requestor issues a request (1). Second, the request misses in the snoop filter directory 126 (2), indicating a targeted cache line does not presently reside in the L2 cache 114 in a valid state. Accordingly, the request is routed to memory, via the memory controller 138 (3). Finally, the memory controller 138 returns the requested data to the GPU core (4).

If the request hits in the remote cache directory, at step 508, a bus command is sent to the CPU to invalidate or evict its cached copy or, in some cases, to read the requested data directly from the L2 cache. As previously described, if the data is valid, the CPU will do a write with kill (WWK) to evict the cache line to memory and then send a flush acknowledge (FLUSHACK) response. Once the CPU response is received, at step 510, processing of the request may continue, for example, by routing the request to memory (step 506) after the CPU has invalidated/cast out its cached copy of the requested data.

Figure 6B:
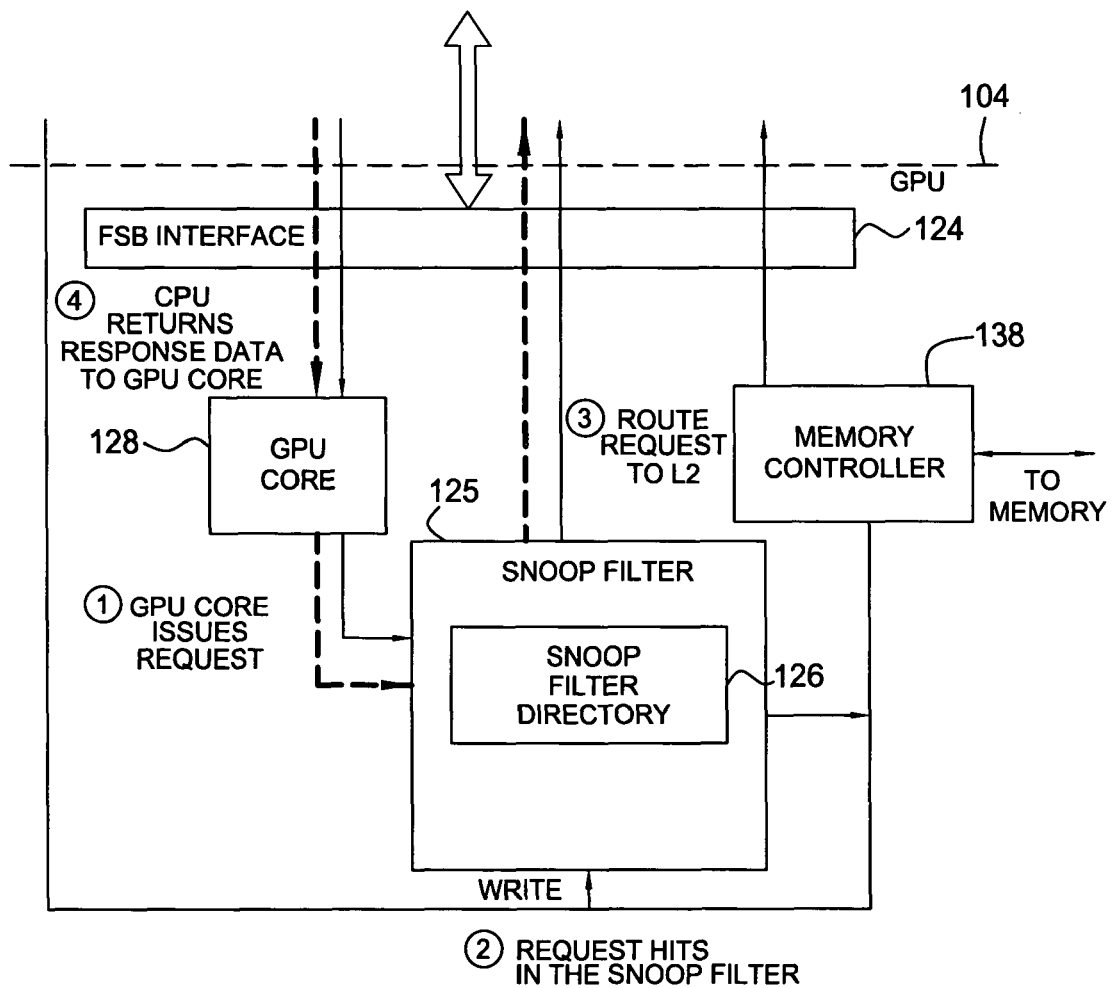

In some cases, data may be returned by the CPU 102 directly to the GPU 104. This scenario is illustrated in the exemplary data path diagram of FIG. 6B, which illustrates the routing of a request for data that is cached in the L2 114 in a valid state. First, a GPU core or other requestor issues a request (1). Second, the request hits in the snoop filter directory 126, indicating a targeted cache line resides in the L2 cache 114 in a valid state. Accordingly, a request is routed to the L2 114 (3). For some embodiments, and in some instances, the L2 114 logic may respond by sending a response with the requested data directly to the requesting GPU core (4).

This approach may reduce latency by eliminating the need for the GPU core to generate a separate response to read the requested memory. In some cases, if the data has been modified, it may be marked as dirty in the response, causing the GPU 104 to generate a write to memory. In some cases, however, the GPU 104 may access a special set of registers, referred to as a lock set, that does not require backing to memory (e.g., the GPU reads, but never writes to these registers). The concepts of utilizing such a lock set are described in detail in the commonly owned application, entitled "Direct Access of Cache Lock Set Data Without Backing Memory".

It should be noted that, in some cases, the remote cache directory 126 may indicate more valid cache lines are in the L2 cache 114 than are indicated by the CPU cache directory 115 (e.g., the valid cache lines indicated by the remote cache directory may represent a superset of the actual valid cache lines). This is because there may be requests which indicate state changes in the L2 cache 114 (see FIG. 4A) that are "in flight" to the snoop filter 125. As a result, there is a window of time before the remote cache directory 126 in the snoop filter 125 is updated to match cache lines in the L2 cache 114.

In such cases, as illustrated in FIG. 6C, the CPU 102 may respond to requests from the GPU 104 with what may be referred to as "reflected" read (or write) requests that are, in effect requests reflected back to the GPU 104 to be routed to the memory controller 138 for execution against memory (e.g., on behalf of the requesting GPU core 128). In such cases, the memory controller 138 may then respond with requested data directly to the requesting GPU core. The concepts of reflected reads are described in detail in the commonly owned application, entitled "Efficient Low Latency Coherency Protocol For A Multi-Chip MultiprocessorSystem" Ser. No. 10/961,751.

Conclusion

By maintaining a remote cache directory on (or accessible to) a remote device that mirrors the contents of an L2 cache directory of a processor that shares memory with the remote device, coherency logic (a snoop filter) may filter out requests initiated at the remote device that do not target memory locations contained in the L2 cache and route those requests directly to memory. By thus avoiding expensive snoop requests, latency and bus bandwidth conventionally associated with snoop logic may be reduced.

While the foregoing is directed to embodiments of the present invention, other and further embodiments of the invention may be devised without departing from the basic scope thereof, and the scope thereof is determined by the claims that follow.

What is claimed is:

1. A method of maintaining coherency of data accessed by a remote device, comprising:
    maintaining, on the remote device, a remote cache directory indicative of memory locations residing in a cache on a processor which shares access to some portion of a memory device;
    routing a first memory request issued at the remote device to the memory device without sending snoop requests to the processor if information contained in the remote cache directory indicates a valid copy of data targeted by the request does not reside in the processor cache;
    routing a second memory request to the memory device when the remote cache directory indicates that a memory location targeted by the second memory request is cached in an L2 cache in a shared coherency state; and
    sending a bus command to the processor if information contained in the remote cache directory indicates a valid copy of data targeted by the first memory request resides in the processor cache.

2. The method of claim 1, wherein maintaining the remote cache directory comprises monitoring, at the remote device, requests to memory issued by the processor.

3. The method of claim 2, wherein maintaining the remote cache directory further comprises creating entries in the remote cache directory containing address tags for memory locations targeted by the memory requests and one or more coherency bits.

4. The method of claim 3, wherein the one or more coherency bits comprise a single bit indicating a valid or invalid coherency state.

5. The method of claim 1, wherein the bus command comprises a command to read data directly from the processor cache without accessing the memory device.

6. The method of claim 1, wherein the bus command comprises a command requesting the processor to invalidate or evict its copy of data targeted by the first memory request issued by the remote device.

7. The method of claim 1, wherein the remote cache directory supports valid, invalid, and shared coherency states.

8. The method of claim 1, further comprising sending a bus command to the processor if the remote cache directory indicates the memory location targeted by the second memory request is cached in the L2 cache in the shared coherency state.

9. A device configured to access data stored in memory and cacheable by a processor, comprising:
    at least one processing core;
    a remote cache directory indicative of contents of a processor cache residing on the processor; and
    a snoop filter configured to:
        route a first memory request issued by the processing core to a memory device without sending snoop requests to the processor if information contained in the remote cache directory indicates a valid copy of data targeted by the memory request does not reside in the processor cache;
        route a second memory request to the memory device when the remote cache directory indicates that a memory location targeted by the second memory request is cached in an L2 cache in a shared coherency state; and
        send a bus command to the processor if information contained in the remote cache directory indicates a valid copy of data targeted by the first memory request resides in the processor cache.

10. The device of claim 9, wherein the snoop logic is configured to:
    monitor memory requests issued by the processor; and
    in response, updates entries in the remote cache directory containing address tags for memory locations targeted by the memory requests and one or more coherency bits.

11. The device of claim 10, wherein the one or more bits comprise more than one bit to indicate valid, invalid and shared coherency states.

12. The device of claim 9, wherein the bus command comprises a command to read data directly from the processor cache without accessing the memory device.

13. The device of claim 9, wherein the bus command comprises a command requesting the processor to invalidate or evict its copy of data targeted by the first memory request issued by the processing core.

14. The device of claim 9, wherein the snoop filter is configured to route the first and second memory requests to the memory device via a memory controller residing on the remote device.

15. A coherent system, comprising:
- a processor comprising a cache for storing data accessed from an external memory device and a cache directory with entries indicating which memory locations are stored in cache lines of the cache and corresponding coherency states thereof; and
- a remote device comprising a remote cache directory indicative of contents of the cache residing on the processor and a snoop filter configured to:
- route a first memory request issued at the remote device to the memory device without sending snoop requests to the processor if information contained in the remote cache directory indicates a valid copy of data targeted by the memory request does not reside in the processor cache;
- route a second memory request to the memory device when the remote cache directory indicates that a memory location targeted by the second memory request is cached in an L2 cache in a shared coherency state; and
- send a bus command to the processor if information contained in the remote cache directory indicates a valid copy of data targeted by the first memory request resides in the processor cache.

16. The system of claim 15, wherein the remote device is a graphics processing unit (GPU) including one or more graphics processing cores.

17. The system of claim 15, wherein the snoop filter is configured to:
- monitor memory requests issued by the processor; and
- in response, updates entries in the remote cache directory containing address tags for memory locations targeted by the memory requests and one or more coherency bits.

* * * * *